US012780601B2

(12) United States Patent
Li et al.

(10) Patent No.: US 12,780,601 B2
(45) Date of Patent: Nov. 3, 2026

(54) ELEVATOR COMMUNICATION SYSTEM AND METHOD, STORAGE MEDIUM

(71) Applicant: Otis Elevator Company, Farmington, CT (US)

(72) Inventors: Bichun Li, Shanghai (CN); Shenhong Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1399 days.

(21) Appl. No.: 17/520,362

(22) Filed: Nov. 5, 2021

(65) Prior Publication Data

US 2022/0219940 A1 Jul. 14, 2022

(30) Foreign Application Priority Data

Jan. 13, 2021 (CN) ........................ 202110041890.0

(51) Int. Cl.

*B66B 1/34* (2006.01)
*B66B 1/46* (2006.01)
*B66B 3/00* (2006.01)
*H04B 7/15* (2006.01)

(52) U.S. Cl.

CPC ............ *B66B 1/3461* (2013.01); *B66B 1/468* (2013.01); *B66B 3/002* (2013.01); *H04B 7/15* (2013.01); *B66B 2201/101* (2013.01); *B66B 2201/4638* (2013.01); *B66B 2201/4653* (2013.01)

(58) Field of Classification Search

CPC ....... B66B 1/3461; B66B 1/468; B66B 3/002; B66B 2201/101; B66B 2201/4638; B66B 2201/4653; B66B 1/06; B66B 1/3423; B66B 2201/4607; H04B 7/15

See application file for complete search history.

(56) References Cited

U.S. PATENT DOCUMENTS

| | | | |
|---|---|---|---|
| 6,408,986 B1 | 6/2002 | Ayano et al. |
| 6,601,679 B2 | 8/2003 | Crenella et al. |
| 6,629,583 B2 | 10/2003 | Valk et al. |
| 7,134,530 B2 | 11/2006 | Motoyama et al. |

(Continued)

FOREIGN PATENT DOCUMENTS

| | | | |
|---|---|---|---|
| CN | 102887404 A * | 1/2013 |
| CN | 103771205 A | 5/2014 |

(Continued)

OTHER PUBLICATIONS

European Search Report for Application No. 21210585.2; Issued Jul. 25, 2022; 8 Pages.

(Continued)

*Primary Examiner* — Bickey Dhakal

(74) *Attorney, Agent, or Firm* — CANTOR COLBURN LLP

(57) ABSTRACT

An elevator communication system and method, a storage medium. The system includes: a first wireless processing unit configured to receive a request for elevator in a wired manner, and configured to forward the request for elevator in a wireless manner; and a second wireless processing unit configured to receive the request for elevator from the first wireless processing unit in a wireless manner, and configured to forward the request for elevator to an elevator controller in a wired manner.

24 Claims, 8 Drawing Sheets

(56) References Cited

U.S. PATENT DOCUMENTS

| | | | | |
|---|---|---|---|---|
| 7,377,364 | B2 * | 5/2008 | Tyni ........................ | B66B 1/468<br>187/391 |
| 8,253,548 | B2 | 8/2012 | Oh et al. | |
| 2019/0115943 | A1 | 4/2019 | Rytilae et al. | |

FOREIGN PATENT DOCUMENTS

| | | | | | |
|---|---|---|---|---|---|
| CN | 102708663 | B | | 11/2014 | |
| CN | 104973469 | A | * | 10/2015 | ............... B66B 5/00 |
| CN | 104355193 | B | | 8/2016 | |
| CN | 106296954 | A | | 1/2017 | |
| CN | 205855656 | U | | 1/2017 | |
| CN | 106044421 | B | | 10/2018 | |
| CN | 109319611 | A | | 2/2019 | |
| CN | 110104513 | A | | 8/2019 | |
| CN | 105600632 | B | | 9/2019 | |
| EP | 2703328 | B1 | | 8/2015 | |
| EP | 3715298 | A1 | | 9/2020 | |
| JP | H1087194 | A | | 4/1998 | |
| JP | 2002114459 | A | | 4/2002 | |
| JP | 2016190699 | A | | 11/2016 | |
| WO | 0034169 | A1 | | 6/2000 | |
| WO | 0034170 | A1 | | 6/2000 | |

OTHER PUBLICATIONS

Chinese Office Action for Application No. 202110041890.0, Issued May 24, 2025, 9 Pages.

* cited by examiner

ELEVATOR COMMUNICATION SYSTEM AND METHOD, STORAGE MEDIUM

FOREIGN PRIORITY

This application claims priority to Chinese Patent Application No. 202110041890.0, filed Jan. 13, 2021, and all the benefits accruing therefrom under 35 U.S.C. § 119, the contents of which in its entirety are herein incorporated by reference.

FIELD OF THE INVENTION

The present application relates to the field of elevator communication, and more specifically, relates to an elevator communication system, an elevator communication method and a computer-readable storage medium.

BACKGROUND OF THE INVENTION

In the prior art, wireless technologies such as Bluetooth are gradually used for elevator communication, but replacing by a brand new Bluetooth module for an elevator system requires a relatively large cost. Therefore, it is necessary to provide a mechanism for elevator wireless communication that can save existing investment and should minimize invasive modifications to existing elevator devices.

SUMMARY OF THE INVENTION

The embodiments of the present application provide an elevator communication system, an elevator communication method and a computer-readable storage medium, which are used to call elevators in a wireless manner, thereby reducing the wiring requirement in a hoistway.

According to one aspect of the present application, an elevator communication system is provided, which comprises: a first wireless processing unit configured to receive a request for elevator in a wired manner, and configured to forward the request for elevator in a wireless manner; and a second wireless processing unit configured to receive the request for elevator from the first wireless processing unit in a wireless manner, and configured to forward the request for elevator to an elevator controller in a wired manner.

In some examples of the present application, optionally, the first wireless processing unit comprises: a first wireless communication interface and a wired input port. The first wireless processing unit is configured to receive the request for elevator through the wired input port, and configured to forward the request for elevator through the first wireless communication interface.

In some examples of the present application, optionally, the second wireless processing unit comprises: a second wireless communication interface and a wired communication interface. The second wireless processing unit is configured to be coupled to the first wireless processing unit through the second wireless communication interface and receive the request for elevator, and configured to forward the request for elevator to the elevator controller through the wired communication interface.

In some examples of the present application, optionally, the system comprises a plurality of first wireless processing units. Each of the plurality of first wireless processing units receives and is able to forward data from other first wireless processing units via its first wireless communication interface, wherein: each of the plurality of first wireless processing units is configured to: be coupled to the second wireless processing unit via its first wireless communication interface, and/or be coupled to the second wireless processing unit via other first wireless processing units.

In some examples of the present application, optionally, the plurality of first wireless processing units are disposed within a hoistway.

In some examples of the present application, optionally, one or more of the plurality of first wireless processing units are configured to be on each floor of an elevator, and are located on the opposite side in the hoistway of an exterior panel of the elevator.

In some examples of the present application, optionally, the system is used for elevator controllers for more than one elevator. The system comprises a plurality of the second wireless processing units, and each of the plurality of the second wireless processing units is configured to be coupled to a corresponding elevator controller, respectively.

In some examples of the present application, optionally, the wired communication interface comprises a remote serial interface. Each of the plurality of second wireless processing units is coupled to the corresponding elevator controller through its remote serial interface, and configured to forward the request for elevator through the remote serial interface.

In some examples of the present application, optionally, the wired communication interface comprises a group communication interface. Each of the plurality of second wireless processing units is coupled to the corresponding elevator controller, other second wireless processing units and their corresponding elevator controller through the group communication interface, and configured to forward the request for elevator through the group communication interface.

In some examples of the present application, optionally, the second wireless processing unit is further configured to receive a response of the elevator controller to the request for elevator through the wired communication interface, and to forward it through the second wireless communication interface.

In some examples of the present application, optionally, the first wireless processing unit further comprises a display port. The first wireless processing unit is further configured to receive the response through the first wireless communication interface, and to output the response through the display port.

In some examples of the present application, optionally, the system further comprises an exterior panel coupled to the first wireless processing unit through the wired input port and sending the request for elevator.

In some examples of the present application, optionally, the first wireless processing unit is further configured to receive the request for elevator from a user through the first wireless communication interface.

In some examples of the present application, optionally, the request for elevator is from a mobile device. The system is coupled to the mobile device through the first wireless communication interface.

In some examples of the present application, optionally, the first wireless communication interface and the second wireless communication interface are configured to work in the same standard, and support at least one of the following protocol standards: Bluetooth, ZigBee, Wi-Fi.

According to another aspect of the present application, an elevator system is provided, which comprises any one of the elevator communication systems described above.

According to another aspect of the present application, an elevator communication method is provided, which comprises: receiving a request for elevator in a wired manner; and forwarding the request for elevator used to trigger an elevator deployment action of an elevator controller in a wireless manner.

In some examples of the present application, optionally, the method further comprises: receiving the request for elevator from other wireless processing units in a wireless manner and forwarding it in a wireless manner.

In some examples of the present application, optionally, the method further comprises: receiving the request for elevator from a mobile terminal in a wireless manner and forwarding it in a wireless manner.

In some examples of the present application, optionally, the request for elevator from an exterior panel is received in a wired manner.

In some examples of the present application, optionally, the method further comprises: receiving a response of an elevator controller to the request for elevator in a wireless manner; and outputting and presenting the response.

In some examples of the present application, optionally, the method further comprises: receiving the request for elevator initialed outside the elevator cab in a wireless manner; and forwarding the request for elevator to an elevator controller in a wired manner to implement an elevator deployment.

In some examples of the present application, optionally, the wireless processing unit comprises a remote serial interface, wherein the request for elevator is forwarded to the elevator controller through the remote serial interface.

In some examples of the present application, optionally, the wireless processing unit comprises a group communication interface, wherein the request for elevator is forwarded to the elevator controller, other wireless processing units and/or corresponding elevator controllers of other wireless processing units through the group communication interface.

In some examples of the present application, optionally, the method further comprises: receiving a response of the elevator controller to the request for elevator in a wired manner; and forwarding the response in a wireless manner.

According to another aspect of the present application, a computer-readable storage medium is provided, which stores instructions thereon, wherein the instructions, when executed by a processor, cause the processor to perform any method described above.

According to another aspect of the present application, an elevator communication method is provided, which comprises: receiving a request for elevator initialed by a user through a first wireless processing unit in a wired manner, and forwarding the request for elevator in a wireless manner; and receiving the forwarded request for elevator through a second wireless processing unit in a wireless manner; and forwarding the request for elevator to an elevator controller in a wired manner.

In some examples of the present application, optionally, the request for elevator is from an exterior panel coupled to the first wireless processing unit in a wired manner.

In some examples of the present application, optionally, the method further comprises: receiving a response of the elevator controller to the request for elevator through the second wireless processing unit in a wired manner, and forwarding the response in a wireless manner; and receiving the response through the first wireless processing unit in a wireless manner, and outputting and presenting the response.

BRIEF DESCRIPTION OF THE DRAWINGS

The above and other objects and advantages of the present invention will become more complete and clear from the following detailed description in conjunction with the accompanying drawings, wherein the same or similar elements are represented by the same reference numerals.

DETAILED DESCRIPTION OF THE EMBODIMENT(S) OF THE INVENTION

For the sake of brevity and illustrative purposes, the principles of the present application have been described herein mainly with reference to exemplary embodiments thereof. However, those skilled in the art will readily recognize that the same principles may be equivalently applied to all types of elevator communication systems, elevator communication methods, and computer-readable storage media, and that these same or similar principles can be implemented therein. Any type of such modifications does not depart from the true spirit and scope of the present application.

Figure 1:
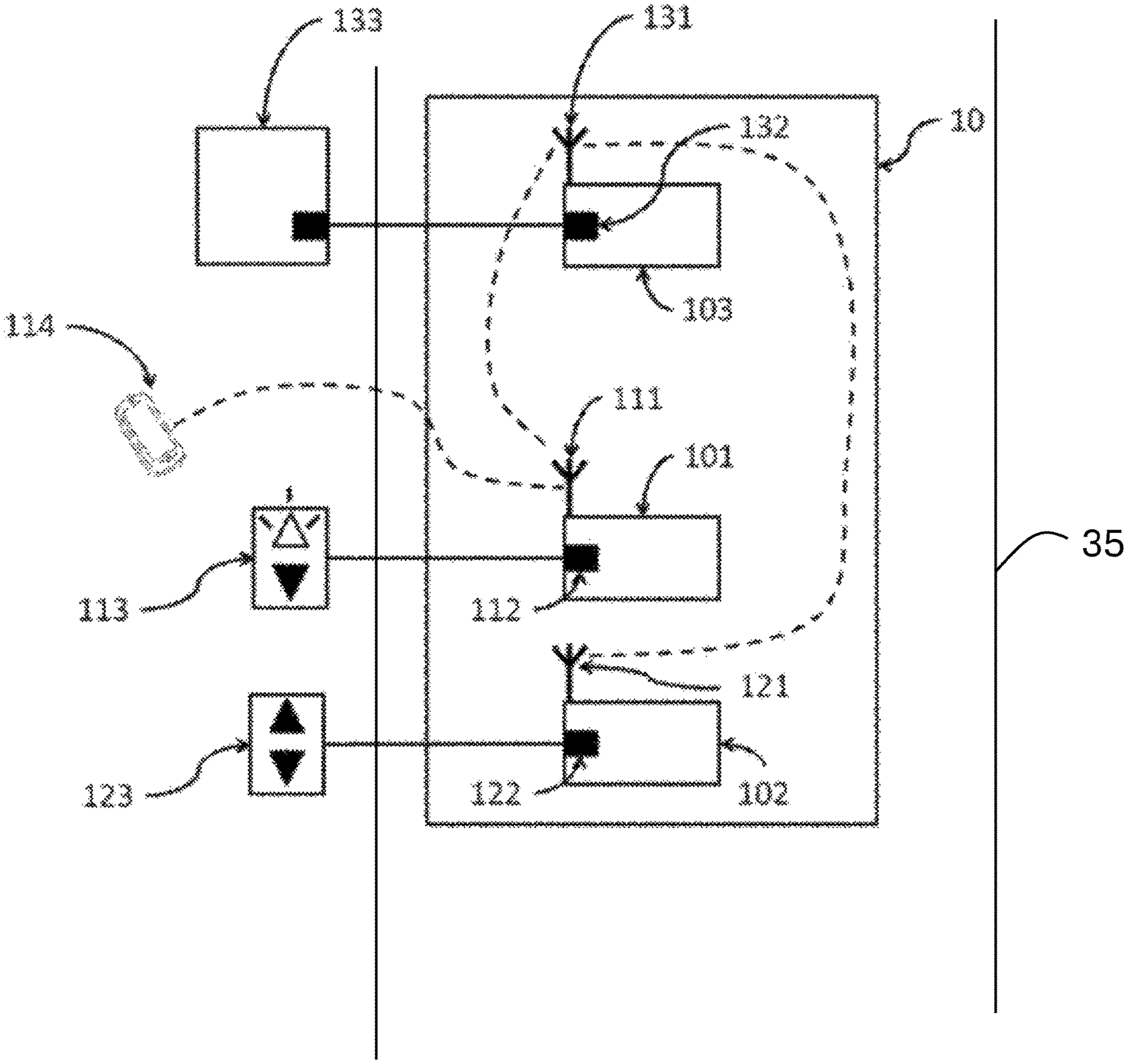
FIG. 1 shows an elevator communication system according to one embodiment of the present application.

According to one aspect of the present application, an elevator communication system is provided. As shown in FIG. 1, the elevator communication system 10 comprises a first wireless processing unit 101 and a first wireless processing unit 102. Two first wireless processing units are shown for exemplary purposes in the figure, but the present invention is not limited in this regard. The elevator communication system of the present invention may comprise more than two first wireless processing units as well. The elevator communication system 10 further comprises a second wireless processing unit 103. The first wireless processing unit and the second wireless processing unit of the present invention have at least basic data processing capability. In addition, their data transceiving capability and the like will also be described below.

As shown in FIG. 1, the first wireless processing unit 101 comprises a first wireless communication interface 111, a wired input port 112. Similarly, the first wireless processing unit 102 comprises a first wireless communication interface 121, a wired input port 122. Hereinafter, the principle of the present invention will be explained by taking the first wireless processing unit 101 and the components contained therein as an example.

The first wireless processing unit such as the first wireless processing unit 101 is a lower processing circuit of the elevator communication system 10, which can be disposed on each floor for processing and communicating a request for elevator to an elevator controller (machine room).

The first wireless processing unit 101 is configured to receive a request for elevator through the first wireless communication interface 121 and/or the wired input port 112 in a wireless and/or wired manner, and is further configured to forward the request for elevator (e.g., to the second wireless processing unit 103) through the first wireless communication interface 121 in a wireless manner. In some examples, the first wireless processing unit 101 may receive the request for elevator only in a wired manner, which may save investment to a larger extent.

For example, in some examples, the elevator communication system 10 further comprises an exterior panel 113, which is coupled to the first wireless processing unit 101 through the wired input port 112 and sends the request for elevator. Similarly, an exterior panel 123 is coupled to the first wireless processing unit 102 through the wired input port 122 and sends the request for elevator. The up direction key of the exterior panel 113 is illuminated, which indicates that the user's request for elevator has been sent out, or the elevator controller has made a response to the user's request for elevator.

For another example, in some examples, the elevator communication system 10 further comprises a mobile device 114, which is coupled to the first wireless processing unit 101 through a first wireless communication interface 111 (the dashed line in the figure represents a coupling link) and sends the request for elevator. The mobile device 114 shown in the figure is a mobile phone. In other examples, the mobile device 114 may also be a variety of devices that can communicate wirelessly with the first wireless processing unit, such as a smart wearable device.

Configured in this manner, the introduction of the first wireless processing unit to the elevator system does not require major changes, so that the equipment such as the original exterior panel of the elevator system will be reserved. This manner may also respect the users' usage habit to a maximum extent that users do not need to pay extra learning costs.

The second wireless processing unit 103 is an upper processing circuit of the elevator communication system 10, which may be generally disposed in a machine room or the like for receiving the request for elevator and forwarding it to the elevator controller. As shown in FIG. 1, the second wireless processing unit 103 of the elevator communication system 10 comprises a second wireless communication interface 131, a wired communication interface 132. The second wireless processing unit 103 is configured to be coupled to, for example, the first wireless processing unit 101 through the second wireless communication interface 131 (the dashed line in the figure represents a coupling link) and receives the request for elevator, and is further configured to forward the request for elevator to the elevator controller 133 through the wired communication interface 132.

As such, the second wireless processing unit 103 may continue to use the cables that have been laid down for the elevator controller 133. The wired communication interface 132 may support the protocols that have been supported by the elevator controller 133. Thus, the manner of introducing the second wireless processing unit 103 may reduce invasive modifications to the elevator controller 133 to a maximum extent.

Figure 3:
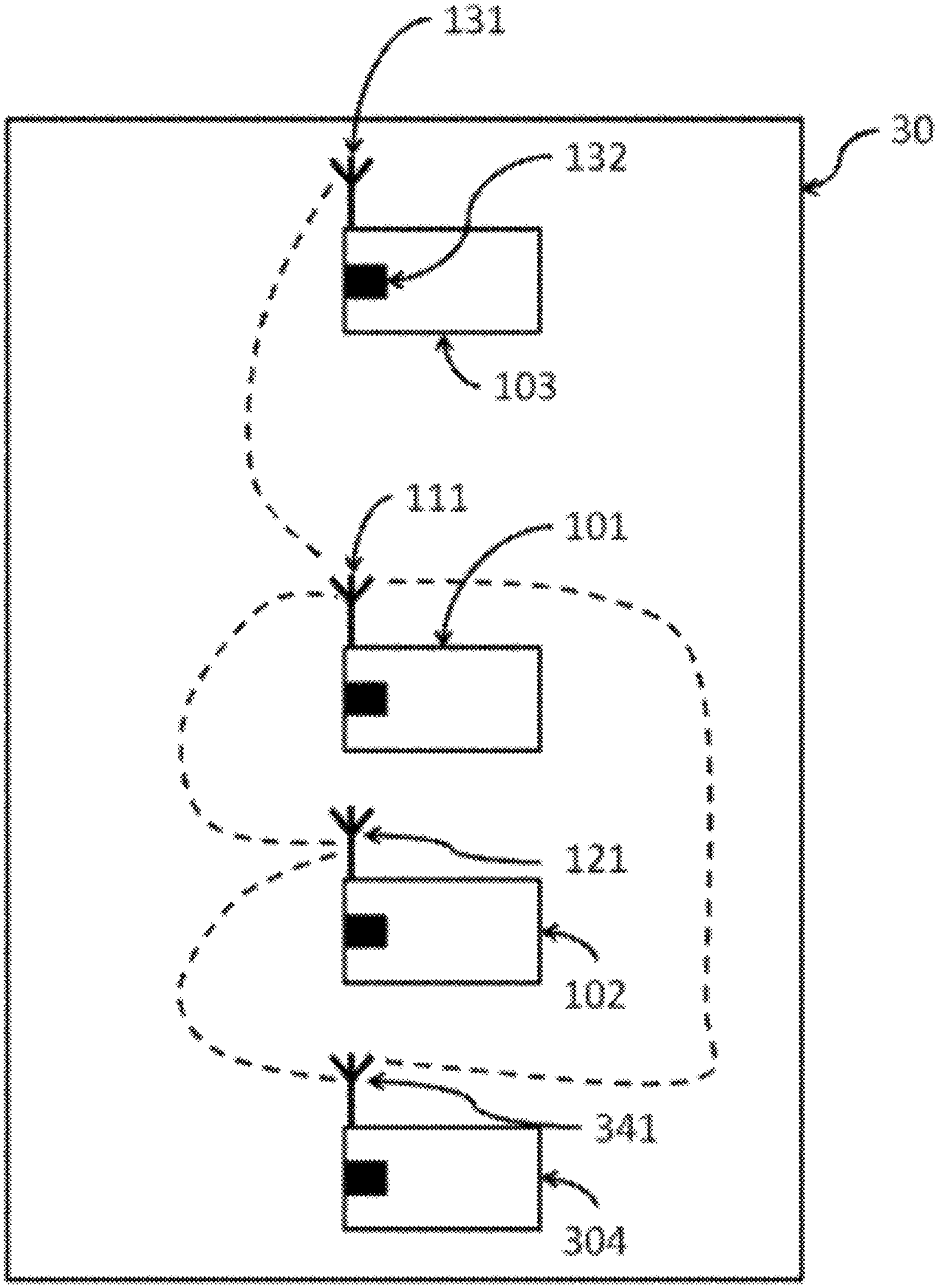
FIG. 3 shows an elevator communication system according to one embodiment of the present application.

In some embodiments of the present application, the elevator communication system comprises a plurality of first wireless processing units. The elevator communication system 30 shown in FIG. 3 comprises three first wireless processing units (101, 102, and 304). Each part of the elevator communication system 30 can be configured in accordance with the corresponding example of FIG. 1, and for the purposes of presenting clearly, some of the numbers in FIG. 1 are omitted in FIG. 3.

The first wireless processing unit of the elevator communication system 30 may form a mesh network, and each first wireless processing unit acts as a node of the network. The nodes may communicate directly or indirectly with each other.

Furthermore, if any one of the nodes in the network has the communication capability with the second wireless processing unit 103, then all nodes in the whole network have the communication capability with the second wireless processing unit 103. In particular, each of the first wireless processing units 101, 102, and 304 may receive and be able to forward data from other first wireless processing units via their first wireless communication interfaces 111, 121, and 341, respectively. For example, the first wireless processing unit 101 may receive data from the first wireless processing units 102, 304 via the first wireless communication interface 111. As such, some of the plurality of first wireless processing units (e.g., the first wireless processing unit 101) can be directly coupled to the second wireless processing unit 103 via their first wireless communication interface 111. Some other of the plurality of first wireless processing units (e.g., the first wireless processing unit 102, 304) can be indirectly coupled to the second wireless processing unit 103 via other first wireless processing units (e.g., the first wireless processing unit 101).

It should be noted that the indirect coupling of the first wireless processing unit to the second wireless processing unit 103 may include "multi-hop". For example, the first wireless processing unit 304 may be relayed twice via the first wireless processing units 102 and 101 to be coupled to the second wireless processing unit 103.

In some embodiments of the present application, the first wireless processing units are disposed within a hoistway, so as to realize the coupling of each first wireless processing unit to the second wireless processing unit within the hoistway. Arranging the first wireless processing units within the hoistway can also prevent the bareness from influencing the integrity and beauty of the building.

In some embodiments of the present application, at least a portion (one or more) of the first wireless processing units are configured on each floor of the elevator and located on the opposite side in the hoistway 35 (FIG. 1) of the elevator's exterior panel, which facilitate the use of existing cables of the exterior panel. As described above, the first wireless processing unit will receive the request for elevator from the exterior panel or mobile device. While the exterior panel and people's activity are on each floor, it is necessary to dispose one first wireless processing unit for each floor. Each floor may also be disposed with more than one first wireless processing unit, some of which may receive the request for elevator not through a wired input port, but receive or relay the request for elevator only through the first wireless communication interface. Furthermore, a portion of the first wireless processing units may further be configured between each floor within the hoistway for receiving or relaying the request for elevator. A portion of the first wireless processing units may further be configured on the path between the hoistway and the machine room for receiving or relaying the request for elevator.

Figure 2:
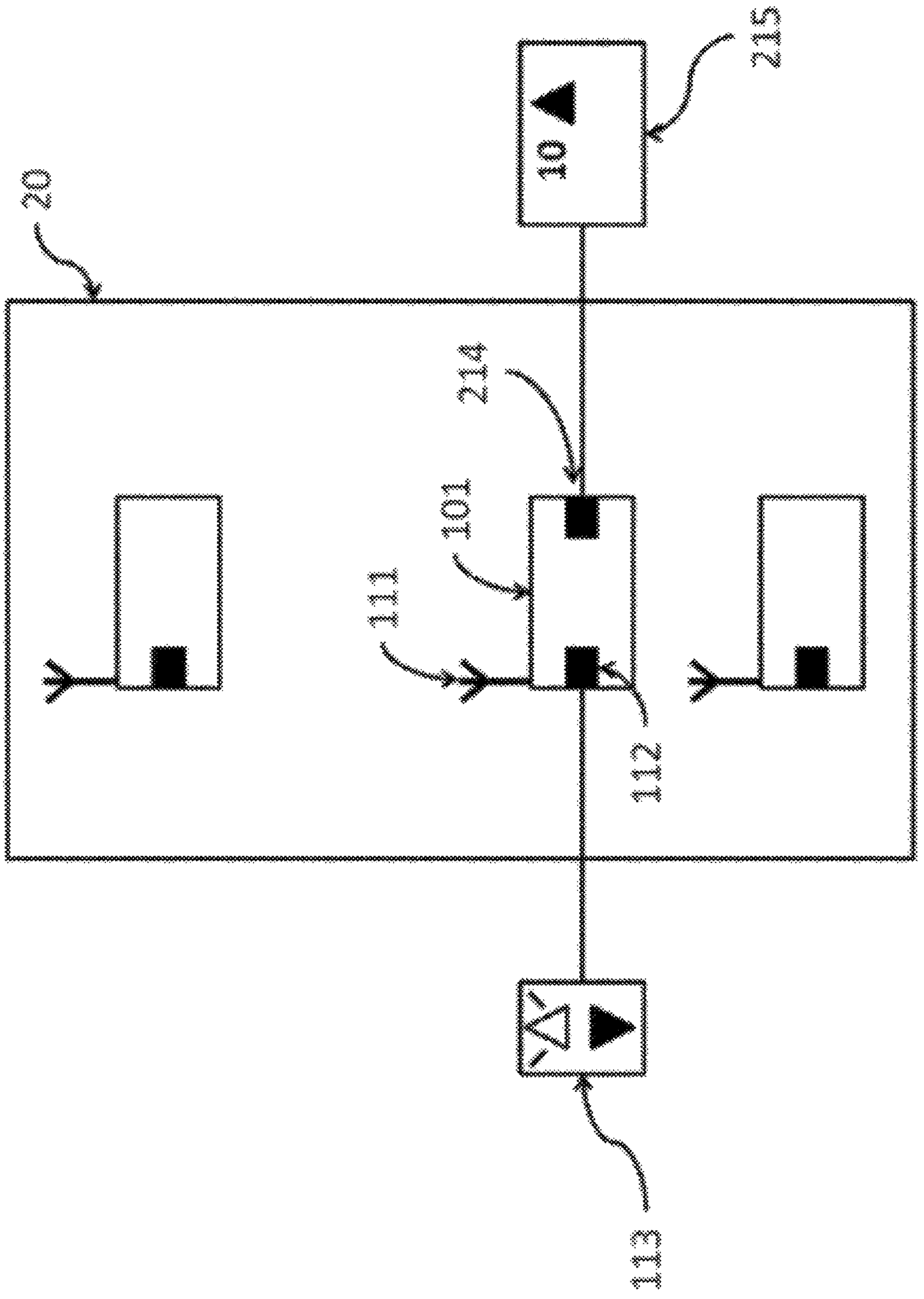
FIG. 2 shows an elevator communication system according to one embodiment of the present application.

In some embodiments of the present application, as shown in FIG. 2, the first wireless processing unit 101 of the elevator communication system 20 further comprises a display port 214. The first wireless processing unit 101 is further configured to receive a response of the elevator controller to the request for elevator through the first wireless communication interface 111, and output it through the display port 214. FIG. 2 shows that the display device 215 may receive the display data from the first wireless processing unit 101 through the display port 214, and may display the response of the elevator controller to the request for elevator, such as the current moving direction of the elevator (shown by the arrow in the figure) and the current floor (shown as "10" in the figure).

Figure 4:
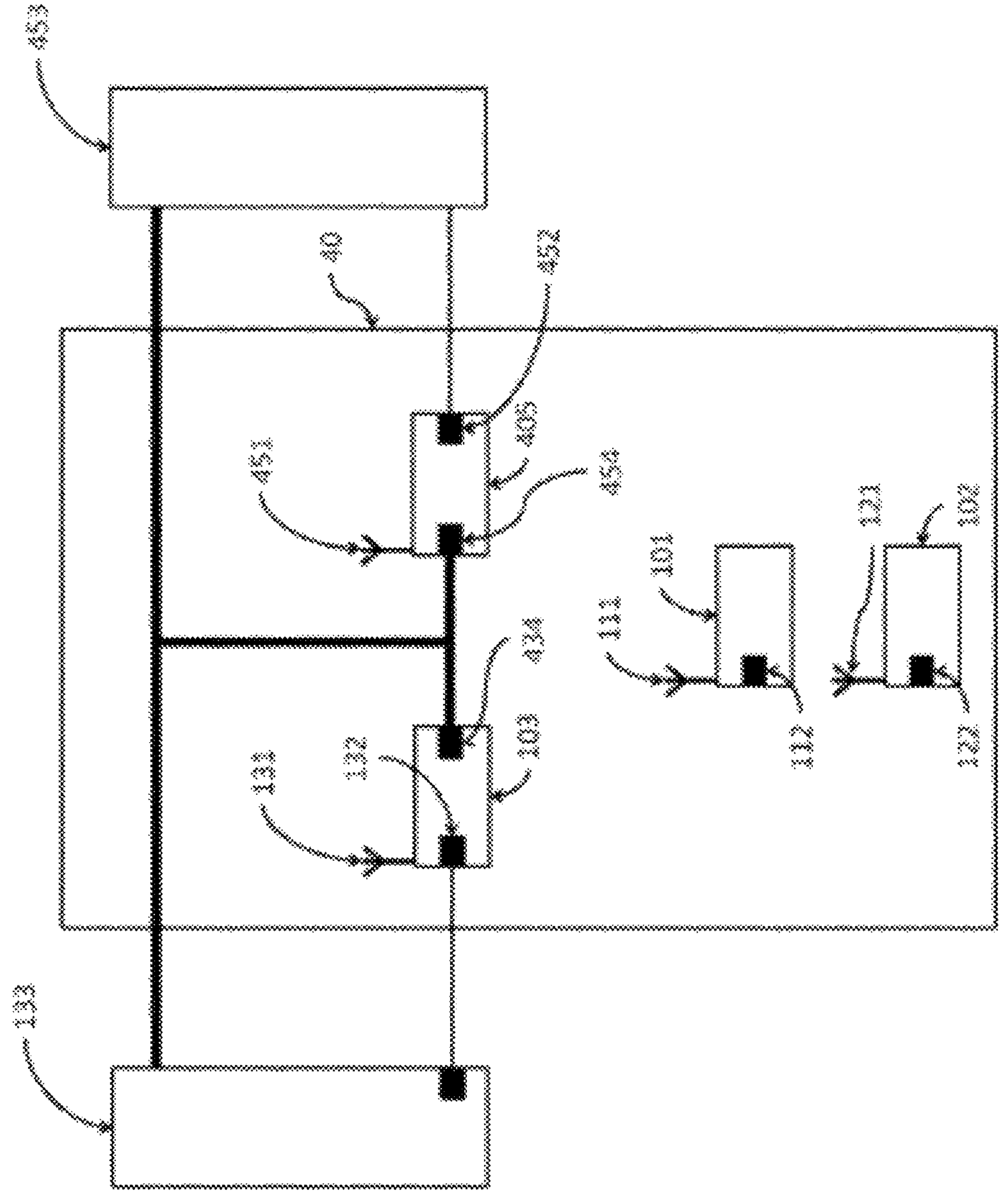
FIG. 4 shows an elevator communication system according to one embodiment of the present application.

In some embodiments of the present application, as shown in FIG. 4, the elevator communication system 40 comprises a plurality of second wireless processing units—the second wireless processing units 103 and 405, which are configured to be coupled to their corresponding elevator controllers 133 and 453. In some examples of the present invention, one second wireless processing unit serves one elevator controller (one elevator).

In some embodiments of the present application, the wired communication interfaces of the second wireless processing units 103 and 405 specifically comprise remote serial interfaces (RSLs) 132 and 452. The second wireless processing units 103 and 405 are coupled to the corresponding elevator controllers 133 and 453 through the remote serial interfaces 132 and 452, respectively, and are configured to forward the request for elevator through the remote serial interfaces 132 and 452. As such, tasks can be allocated among the plurality of elevators according to the request for elevator. When using the remote serial interfaces 132 and 452 to communicate the request for elevator, one of the elevator controllers (e.g., elevator controller 133) will be elected as the master controller, and other controllers (e.g., elevator controller 453) will be served as slave controllers. The allocation scheme of tasks may be determined by the master controller.

With continued reference to FIG. 4, in some embodiments of the present application, the wired communication interfaces of the second wireless processing units 103 and 405 comprise group communication interfaces 434 and 454 for implementing a Group Ring. The second wireless processing units 103 and 405 are coupled to the corresponding elevator controllers 133 and 453 through group communication interfaces 434 and 454, respectively. In addition, the second wireless processing unit 103 is further coupled to the second wireless processing unit 405 and its corresponding elevator controller 453 through a group communication interface 434. The second wireless processing unit 405 is further coupled to the second wireless processing unit 103 and its corresponding elevator controller 133 through a group communication interface 454. The thick line in FIG. 4 is a practicable coupling link. The second wireless processing units 103 and 405 are further configured to forward the request for elevator through the group communication interfaces.

In some embodiments of the present application, the second wireless processing units 103 and 405 are further configured to receive a response of the elevator controller to the request for elevator through wired communication interfaces (remote serial interface and/or group communication interface), and forward it through the second wireless communication interface 131 and 451. The first wireless processing unit can receive the response.

In some embodiments of the present application, the first wireless communication interface and the second wireless communication interface are configured to work in the same standard, and support at least one of the following protocol standards: Bluetooth, ZigBee, Wi-Fi.

According to another aspect of the present application, an elevator system is provided, which comprises any one of the elevator communication systems described above. In addition, the elevator system also comprises other necessary components, such as the elevator controller, cab, and the like, which will not be described in detail here.

Figure 5:
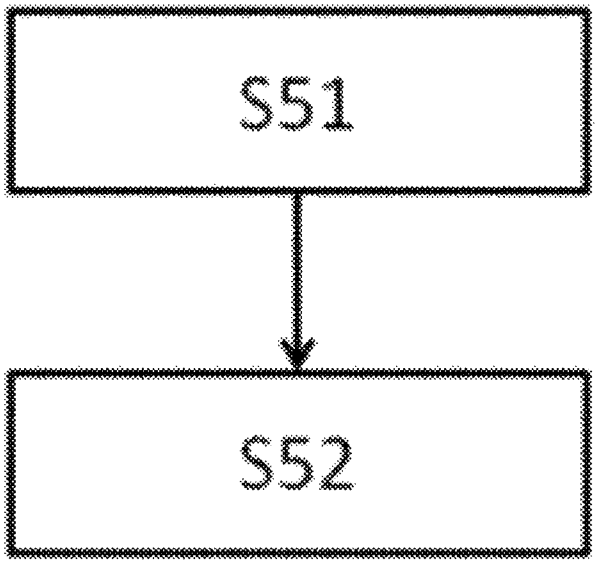
FIG. 5 shows an elevator communication method according to one embodiment of the present application.

According to another aspect of the present application, an elevator communication method for such as a wireless processing unit (in particular, a lower wireless processing unit, which will be set forth in detail below) is provided (referred to an elevator communication method for short). As shown in FIG. 5, the elevator communication method comprises the following steps. In step S51, a request for elevator is received through a first wireless communication interface and/or a wired input port of a wireless processing unit. In step S52, the request for elevator is forwarded through the first wireless communication interface.

In step S51, the elevator communication method receives a request for elevator through such as the first wireless communication interface and/or the wired input port of the wireless processing unit in a wireless and/or wired manner. The request for elevator is used to trigger an elevator deployment action of an elevator controller. In some embodiments of the present application, specifically in step S51, a request for elevator from the exterior panel is received through the wired input port. For example, in some examples, input components such as the exterior panel may be coupled to the wireless processing unit through the wired input port and send the request for elevator. In some examples, if the direction key of the exterior panel is illuminated, it indicates that the user's request for elevator has been sent out, or the elevator controller has made a response to the user's request for elevator.

In some embodiments of the present application, specifically in step S51, a request for elevator from the mobile terminal is received through the first wireless communication interface. For another example, in some examples, a mobile device, for example, may be coupled to the wireless processing unit through the first wireless communication interface and send the request for elevator. The mobile device can be any device that can communicate wirelessly with the wireless processing unit, such as a mobile phone, a smart wearable device.

The wireless processing unit in the above examples is a lower processing circuit of the elevator communication system, which can be disposed on each floor for processing and communicating a request for elevator to an elevator controller (machine room). Configured in this manner, the introduction of the wireless processing unit to the elevator system does not require major changes, so that the equipment such as the original exterior panel of the elevator system will be reserved. This manner may also respect the users' usage habit to a maximum extent that users do not need to pay extra learning costs.

In some embodiments of the present application, specifically in step S51, a request for elevator from other wireless processing units is received through the first wireless communication interface. At this point, the wireless processing unit will exist as a relay or bridge device, and forward the request for elevator in step S52. The wireless processing unit of the elevator communication system may form a mesh network, and each wireless processing unit acts as a node of the network. The nodes may communicate directly or indirectly with each other. Furthermore, if any one of the nodes in the network has the communication capability with the upper wireless processing unit (disposed within the machine room for communicating with the elevator controller), then all nodes in the whole network have the communication capability with the upper wireless processing unit.

In step S52, the elevator communication method forwards the request for elevator through such as the first wireless communication interface in a wireless manner, for example, to the upper wireless processing unit.

Figure 6:
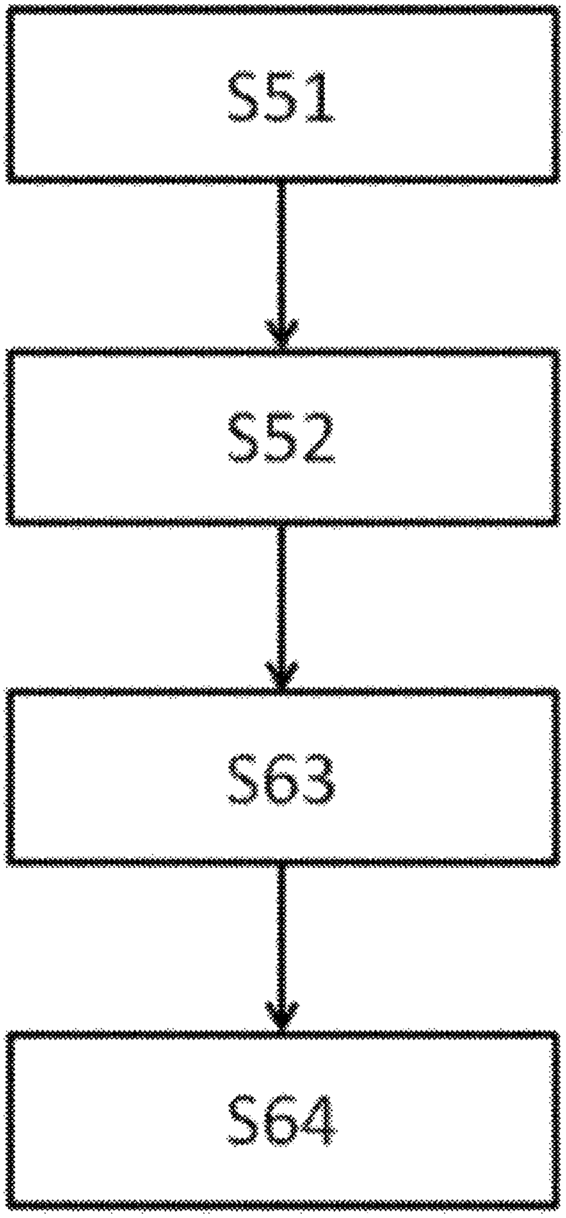
FIG. 6 shows an elevator communication method according to one embodiment of the present application.

In some embodiments of the present application, as shown in FIG. 6, in addition to the steps described above, the elevator communication method further comprises the following steps. In step S63, a response of the elevator controller to the request for elevator is received through such as the first wireless communication interface (e.g., from the upper wireless processing unit) in a wireless manner. In step S64, the response is outputted through the display port of such as the wireless processing unit and may be used for presentation. The display device may receive the display data from the wireless processing unit through the display port, and may display the response of the elevator controller to the request for elevator, such as the current moving direction of the elevator and the current floor.

Figure 7:
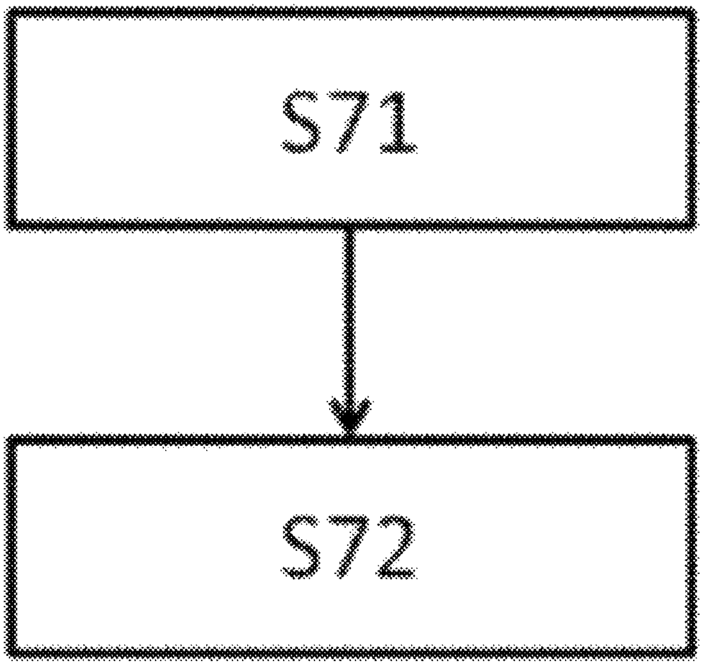
FIG. 7 shows an elevator communication method according to one embodiment of the present application.

According to another aspect of the present application, an elevator communication method for such as a wireless processing unit (in particular, an upper wireless processing unit, which will be set forth in detail below) is provided (referred to an elevator communication method for short). The elevator communication method can be combined with the corresponding examples of FIG. 5 or FIG. 6 to enable the communication between the lower wireless processing unit and the upper wireless processing unit. As shown in FIG. 7, the elevator communication method comprises the following steps. In step S71, a request for elevator initialed outside the elevator cab (e.g., from the elevator lobby) is received through such as the second wireless communication interface of the wireless processing unit in a wireless manner. In step S72, the request for elevator is forwarded to the elevator controller through such as the wired communication interface of the wireless processing unit in a wired manner to implement an elevator deployment.

In some embodiments of the present application, the wired communication interface comprises a remote serial interface, and thus the request for elevator is forwarded to the elevator controller through the remote serial interface in step S72. One or more wireless processing units may be coupled to the corresponding elevator controller through the remote serial interface, respectively, and configured to forward the request for elevator through the remote serial interface. As such, if the elevator system comprises multiple elevators (multiple wireless processing units), tasks can be allocated among the plurality of elevators according to the request for elevator. When using the remote serial interfaces to communicate the request for elevator, one of the elevator controllers will be elected as the master controller, and other controllers will be served as slave controllers. The allocation scheme of tasks may be determined by the master controller.

In some embodiments of the present application, the wired communication interface comprises the group communication interface, and thus the request for elevator is forwarded to the elevator controller, other wireless processing units, and/or the corresponding elevator controller of other wireless processing units through the group communication interface in step S72. The wired communication interfaces of the plurality of wireless processing unit comprise group communication interfaces for implementing a Group Ring. The plurality of wireless processing units are coupled to the corresponding elevator controllers through the group communication interfaces, respectively. In addition, the plurality of wireless processing units are further coupled to other wireless processing units and their corresponding elevator controllers through the group communication interfaces. The wireless processing unit is further configured to forward the request for elevator through the group communication interface.

The wireless processing unit in the above examples is an upper processing circuit of an elevator communication system, which may be generally disposed in a machine room or the like for receiving the request for elevator and forwarding it to the elevator controller. As such, the wireless processing unit may continue to use the cables that have been laid down for the elevator controller. The wired communication interface may support the protocols that have been supported by the elevator controller. Thus, the manner of introducing the wireless processing unit may reduce invasive modifications to the elevator controller to a maximum extent.

Figure 8:
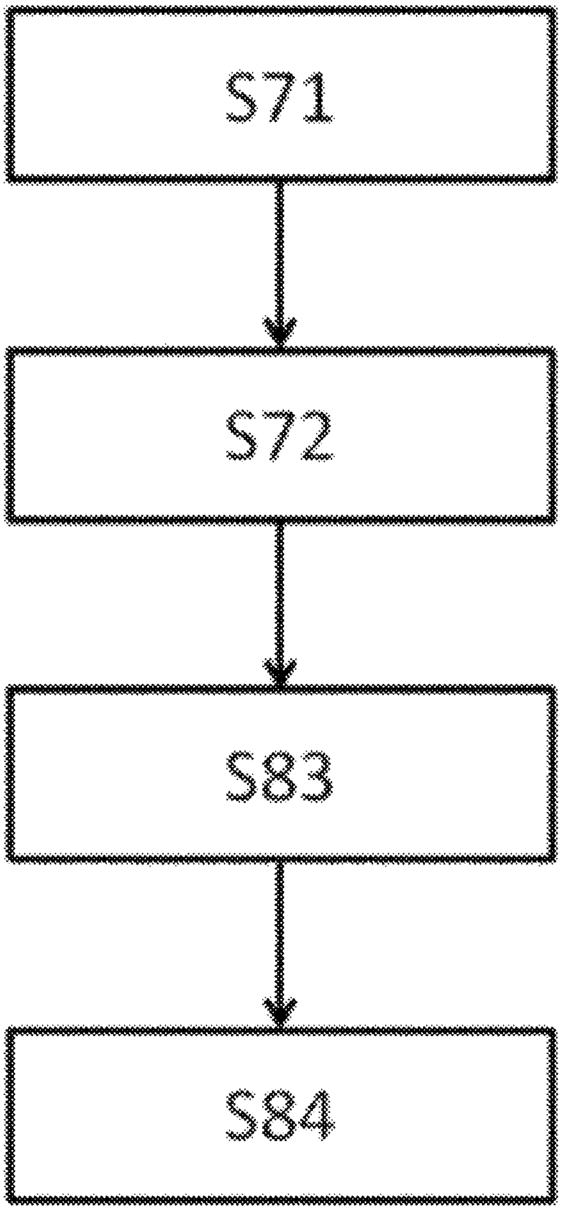
FIG. 8 shows an elevator communication method according to one embodiment of the present application.

In some embodiments of the present application, as shown in FIG. 8, in addition to the steps described above, the elevator communication method further comprises the following steps. In step S83, a response of the elevator controller to the request for elevator is received through such as the wired communication interface (e.g., the remote serial interface and/or group communication interface) in a wired manner. In step S84, the response is forwarded through such as the second wireless communication interface in a wireless manner, for example, to a lower wireless processing unit.

According to another aspect of the present application, an elevator communication method is provided, which comprises the processing process of the upper wireless processing unit discussed above and the lower wireless processing unit. The method comprises: receiving a request for elevator initialed by a user through a first wireless processing unit (i.e., the lower wireless processing unit discussed above) in a wired manner, and forwarding the request for elevator in a wireless manner; and receiving the forwarded request for elevator through a second wireless processing unit (i.e., the upper wireless processing unit discussed above) in a wireless manner; and forwarding the request for elevator to an elevator controller in a wired manner.

In some embodiments of the present application, the request for elevator comes from an exterior panel coupled to the first wireless processing unit in a wired manner.

In some embodiments of the present application, the elevator communication method further comprises: receiving a response of the elevator controller to the request for elevator through the second wireless processing unit in a wired manner, and forwarding the response in a wireless manner; and receiving the response through the first wireless processing unit in a wireless manner, and outputting and presenting the response.

According to another aspect of the present application, a computer-readable storage medium is provided, which stores instructions thereon. The instructions, when executed by a processor, cause the processor to perform elevator communication method of any one of the wireless processing units described above. The computer-readable media according to the present application comprise all types of computer storage media, and may be any available media that can be accessed by a general-purpose or special-purpose computer. By way of example, computer-readable media may comprise RAM, ROM, EPROM, $E^2$PROM, register, hard disk, removable disk, CD-ROM, or other optical disk storage, magnetic disk storage, or other magnetic storage device, or any other transitory or non-transitory medium that can be used to carry or store desired program code units in the form of instructions or data structures and that can be accessed by a general-purpose or special-purpose computer, or a general-purpose or special-purpose processor. As used herein, disks usually reproduce data magnetically, while discs use lasers to reproduce data optically. The combinations discussed above should also be comprised within the claimed scope of the computer-readable medium. An exemplary storage medium is coupled to a processor to enable the processor reading information from/writing information to the storage medium. In the alternative scheme, the storage medium may be integral to the processor. The processor and the storage medium may reside in an ASIC. The ASIC may reside in a user terminal. In the alternative scheme, the processor and storage medium may reside in a user terminal as discrete components.

The above is merely the specific embodiment of the present application, and the claimed scope of the present application is not limited thereto. Those skilled in the art may envision other available variations or substitutions according to the scope of the technology disclosed by the present application that are encompassed within the claimed scope of the present application. The implementations of the present application and the features of the implementations may also be combined with each other without conflict. The claimed scope of the present application is determined by reference to the appended claims.

What is claimed is:

1. An elevator communication system, comprising:

a first wireless processing unit configured to receive a request for elevator in a wired manner, and configured to forward the request for elevator in a wireless manner; and a second wireless processing unit configured to receive the request for elevator from the first wireless processing unit in a wireless manner, and configured to forward the request for elevator to an elevator controller in a wired manner;

wherein the system comprises a plurality of first wireless processing units, each of the plurality of first wireless processing units is configured to receive and forward data from other first wireless processing units via a first wireless communication interface;

wherein each of the plurality of first wireless processing units is coupled to the second wireless processing unit via its first wireless communication interface and coupled to the second wireless processing unit via other first wireless processing units;

wherein the plurality of first wireless processing units are disposed within a hoistway;

wherein one or more of the plurality of first wireless processing units are configured to be on each floor of an elevator, and are located on the opposite side in the hoistway of an exterior panel of the elevator.

2. The system of claim 1, wherein the first wireless processing unit comprises a first wireless communication interface and a wired input port, the first wireless processing unit is configured to receive the request for elevator through the wired input port, and configured to forward the request for elevator through the first wireless communication interface.

3. The system of claim 2, wherein the second wireless processing unit comprises a second wireless communication interface and a wired communication interface, the second wireless processing unit is configured to be coupled to the first wireless processing unit through the second wireless communication interface and receive the request for elevator, and configured to forward the request for elevator to the elevator controller through the wired communication interface.

4. The system of claim 3, wherein the system is used for elevator controllers for more than one elevator, the system comprises a plurality of the second wireless processing units, and each of the plurality of the second wireless processing units is configured to be coupled to a corresponding elevator controller respectively.

5. The system of claim 4, wherein the wired communication interface comprises a remote serial interface, each of the plurality of second wireless processing units is coupled to the corresponding elevator controller through its remote serial interface, and configured to forward the request for elevator through the remote serial interface.

6. The system of claim 4, wherein the wired communication interface comprises a group communication interface, each of the plurality of second wireless processing units is coupled to the corresponding elevator controller, other second wireless processing units and their corresponding elevator controller through the group communication interface, and configured to forward the request for elevator through the group communication interface.

7. The system of claim 3, wherein the second wireless processing unit is further configured to receive a response of the elevator controller to the request for elevator through the wired communication interface, and to forward it through the second wireless communication interface.

8. The system of claim 7, wherein the first wireless processing unit further comprises a display port, the first wireless processing unit is further configured to receive the response through the first wireless communication interface, and to output the response through the display port.

9. The system of claim 3, wherein the first wireless communication interface and the second wireless communication interface are configured to work in the same standard, and support at least one of the following protocol standards: Bluetooth, ZigBee, Wi-Fi.

10. The system of claim 2, wherein the system further comprises an exterior panel coupled to the first wireless processing unit through the wired input port and sending the request for elevator.

11. The system of claim 2, wherein the first wireless processing unit is further configured to receive the request for elevator from a user through the first wireless communication interface.

12. The system of claim 11, wherein the request for elevator is from a mobile device, the system is coupled to the mobile device through the first wireless communication interface.

13. An elevator system comprising the elevator communication system of claim 1.

14. An elevator communication method, comprising:

receiving a request for elevator in a wired manner; and forwarding the request for elevator used to trigger an elevator deployment action of an elevator controller in a wireless manner;

receiving the request for elevator from other wireless processing units in a wireless manner and forwarding it in a wireless manner;

wherein wireless processing units are disposed within a hoistway;

wherein the wireless processing units are configured to be on each floor of an elevator, and disposed on a side of an exterior panel of the elevator that is opposite to a side located inside the hoistway.

15. The method of claim 14, further comprising: receiving the request for elevator from a mobile terminal in a wireless manner and forwarding it in a wireless manner.

16. The method of claim 14, wherein the request for elevator from an exterior panel is received in a wired manner.

17. The method of claim 14, the method further comprising:

receiving a response of an elevator controller to the request for elevator in a wireless manner; and outputting and presenting the response.

18. The method of claim 14, the method further comprising:

receiving the request for elevator initialed outside the elevator cab in a wireless manner; and forwarding the request for elevator to an elevator controller in a wired manner to implement an elevator deployment.

19. The method of claim 18, wherein the wireless processing unit comprises a remote serial interface, the request for elevator is forwarded to the elevator controller through the remote serial interface.

20. The method of claim 18, wherein each of the wireless processing units comprises a group communication interface, the request for elevator is forwarded to the elevator controller, other wireless processing units and/or corresponding elevator controllers of other wireless processing units through the group communication interface.

21. The method of claim 18, the method further comprising:

receiving a response of the elevator controller to the request for elevator in a wired manner; and forwarding the response in a wireless manner.

22. A computer-readable storage medium storing instructions thereon, wherein the instructions, when executed by a processor, cause the processor to perform the method of claim 14.

23. An elevator communication method, comprising:

receiving a request for elevator initialed by a user through a first wireless processing unit in a wired manner, and forwarding the request for elevator in a wireless manner; and receiving the forwarded request for elevator through a second wireless processing unit in a wireless manner; and forwarding the request for elevator to an elevator controller in a wired manner;

wherein the request for elevator is from an exterior panel coupled to the first wireless processing unit in a wired manner;

wherein the plurality of first wireless processing units are disposed within a hoistway;

wherein one or more of the plurality of first wireless processing units are configured to be on each floor of an elevator, and disposed on a side of the exterior panel of the elevator that is opposite to a side located inside the hoistway.

24. The method of claim 23, further comprising:

receiving a response of the elevator controller to the request for elevator through the second wireless processing unit in a wired manner, and forwarding the response in a wireless manner; and receiving the response through the first wireless processing unit in a wireless manner, and outputting and presenting the response.

* * * * *